US012759128B2

(12) United States Patent
Takano et al.

(10) Patent No.: US 12,759,128 B2
(45) Date of Patent: Oct. 13, 2026

(54) ELECTRIC WORK EQUIPMENT

(71) Applicant: YAMABIKO CORPORATION, Ohme (JP)

(72) Inventors: Masayuki Takano, Ohme (JP); Takeshi Maeno, Ohme (JP); Yuji Numakunai, Ohme (JP)

(73) Assignee: YAMABIKO CORPORATION (JP)

( * ) Notice: Subject to any disclaimer, the term of this patent is extended or adjusted under 35 U.S.C. 154(b) by 0 days.

(21) Appl. No.: 19/188,159

(22) Filed: Apr. 24, 2025

(65) Prior Publication Data

US 2025/0367811 A1 Dec. 4, 2025

(30) Foreign Application Priority Data

May 31, 2024 (JP) ................................ 2024-088757

(51) Int. Cl.
*B25F 5/02* (2006.01)
*B27B 17/00* (2006.01)
*B27B 17/02* (2006.01)

(52) U.S. Cl.
CPC .......... *B25F 5/026* (2013.01); *B27B 17/0008* (2013.01); *B27B 17/02* (2013.01)

(58) Field of Classification Search
CPC .......... B25F 5/026; B25F 5/02; B27G 19/003; B27B 17/0008; H01H 13/14
See application file for complete search history.

(56) References Cited

U.S. PATENT DOCUMENTS

2007/0101586 A1* 5/2007 Felder .................... B23D 51/00 30/392
2011/0030227 A1* 2/2011 Osawa ...................... B25F 5/02 30/381
2013/0206435 A1* 8/2013 Papp ....................... B25B 21/00 173/20

(Continued)

FOREIGN PATENT DOCUMENTS

DE 202019002700 U1 9/2019
JP 2016-096752 A 5/2016

OTHER PUBLICATIONS

European Search Report issued in the corresponding European Patent Application No. 25156999.2; dated Jul. 28, 2025 (total 12 pages).

*Primary Examiner* — Andrew M Tecco
*Assistant Examiner* — Nicholas E Igbokwe
(74) *Attorney, Agent, or Firm* — Harness, Dickey & Pierce, P.L.C.

(57) ABSTRACT

Electric work equipment includes a body case, a work tool formed to protrude forward from a front portion of the body case, a motor housed in the body case and configured to drive the work tool, a battery removably disposed in the body case and configured to supply power to the motor, a handle protruding from the body case and configured to be gripped, a trigger lever disposed on a lower surface of the handle and configured such that power is supplied from the battery to the motor when pulled, and a switch panel disposed on an upper surface of the handle and including a power switch, the power switch being configured to make the motor operable when turned on and to stop operation of the motor when turned off, and is inclined downward from a right to left side thereof or from the left to right side thereof.

6 Claims, 6 Drawing Sheets

(56) References Cited

U.S. PATENT DOCUMENTS

| | | | | |
|---|---|---|---|---|
| 2014/0116737 | A1* | 5/2014 | Iwata | B25F 5/02<br>173/20 |
| 2014/0190713 | A1* | 7/2014 | Martinsson | B23Q 17/007<br>30/381 |
| 2015/0122524 | A1* | 5/2015 | Papp | B25B 21/00<br>173/20 |
| 2017/0309419 | A1* | 10/2017 | Miyaoka | H01H 13/04 |
| 2018/0200917 | A1* | 7/2018 | Kachi | B27B 17/0008 |
| 2019/0111582 | A1* | 4/2019 | Suzuki | B27B 17/08 |
| 2019/0217496 | A1* | 7/2019 | Shibata | B27B 17/02 |
| 2020/0223090 | A1* | 7/2020 | Osawa | B27B 17/08 |
| 2020/0306847 | A1* | 10/2020 | Osawa | B23D 57/023 |
| 2021/0255715 | A1* | 8/2021 | Gwosdz | B24B 23/005 |

* cited by examiner

ELECTRIC WORK EQUIPMENT

CROSS REFERENCE TO RELATED APPLICATIONS

The present application claims priority under 35 U.S.C. § 119 to Japanese Patent Application No. 2024-88757, filed May 31, 2024, the contents of which are incorporated herein by reference in their entirety.

TECHNICAL FIELD

The present invention relates to electric work equipment.

BACKGROUND ART

Japanese Unexamined Patent Application Publication No. 2016-096752 discloses work equipment.

A brush cutter (work equipment) is provided with a work tool driven by an electric motor, and an operator works using the work tool while gripping a grip. The grip is provided with an operation panel and an indicator panel. The operation panel has an operation button for operating the electric motor, which is disposed on an operation board. The indicator panel has an indicator lamp, which shows the operation status of the electric motor operated by the operation button, disposed on an indicator board. The operation panel and indicator panel are disposed in positions that are close to each other. This brush cutter is characterized by the indicator panel being positioned to face the operator when the operator grips the grip to use the brush cutter in a normal manner.

In the case of the work equipment disclosed in Japanese Unexamined Patent Application Publication No. 2016-096752, the indicator panel can provide improved visibility to the operator when they are using the work equipment in a normal manner. However, the panel does not provide improved operability or visibility, for example, when they are working while tilting the work equipment.

SUMMARY

In view of the above circumstances, the present invention provides electric work equipment or the like whose switch panel provides improved operability and visibility to an operator when they are working while tilting the electric work equipment.

One aspect of the present invention provides electric work equipment including a body case, a work tool formed to protrude forward from a front portion of the body case, a motor housed in the body case and configured to drive the work tool, a battery removably disposed in the body case and configured to supply power to the motor, a handle protruding from the body case and configured to be gripped, a trigger lever disposed on a lower surface of the handle and configured such that power is supplied from the battery to the motor when pulled, and a switch panel disposed on an upper surface of the handle and including a power switch, the power switch being configured to make the motor operable when turned on and to stop operation of the motor when turned off. The switch panel is formed to be inclined downward from a right to left side thereof or from the left to right side thereof.

In the case where the protruding direction of the work tool is forward, one aspect of the present invention has a configuration in which the switch panel is inclined downward at an angle towards either the right or left. Hereinafter, a chainsaw that employes a switch panel configured to be inclined downward from the right side to the left side will be described as an example.

When cutting a tree, for example, the operator needs to work while tilting the chainsaw so that a cutting unit including a guide bar and a saw chain becomes horizontal. In this case, the operator performs the cutting work while tilting the chainsaw by orienting the side handle gripped by the left hand upward and orienting the top handle gripped by the right hand rightward. At this time, the upper surface of the switch panel is oriented toward the operator, unlike the upper surface of a switch panel with a different configuration. Thus, the operator can grasp the position of the power switch while checking the lighting status of the LED light disposed on the upper surface of the switch panel and use the right thumb to turn on and off the power switch.

That is, according to this aspect of the present invention, the switch panel provides improved operability and visibility to the operator when they are working while tilting the electric work equipment.

DETAILED DESCRIPTION

Now, an embodiment of the present invention will be described with reference to the drawings. Various features described in the embodiment below can be combined with each other.

In the present embodiment, electric work equipment will be described as a chainsaw for cutting trees, boards, or the like. In the following description, it is assumed that the side on which the cutting unit of the chain saw is disposed is the front side and the side on which a top handle is disposed is the upper side.

1. Overall Configuration

The overall configuration of a chainsaw 100 according to the present embodiment will be described in Section 1.

Figure 1:
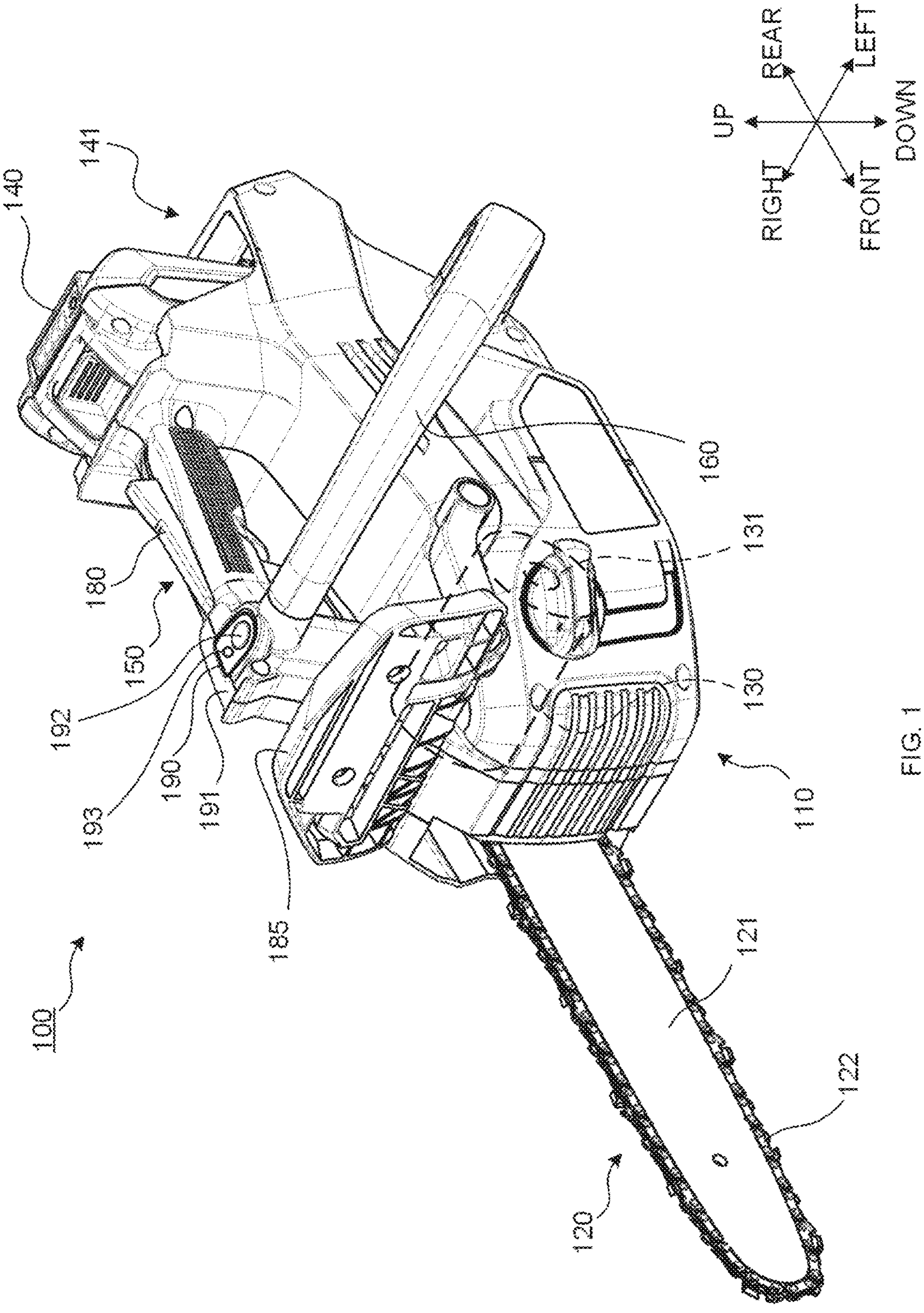
FIG. 1 is a perspective view of a chainsaw.
Figure 2:
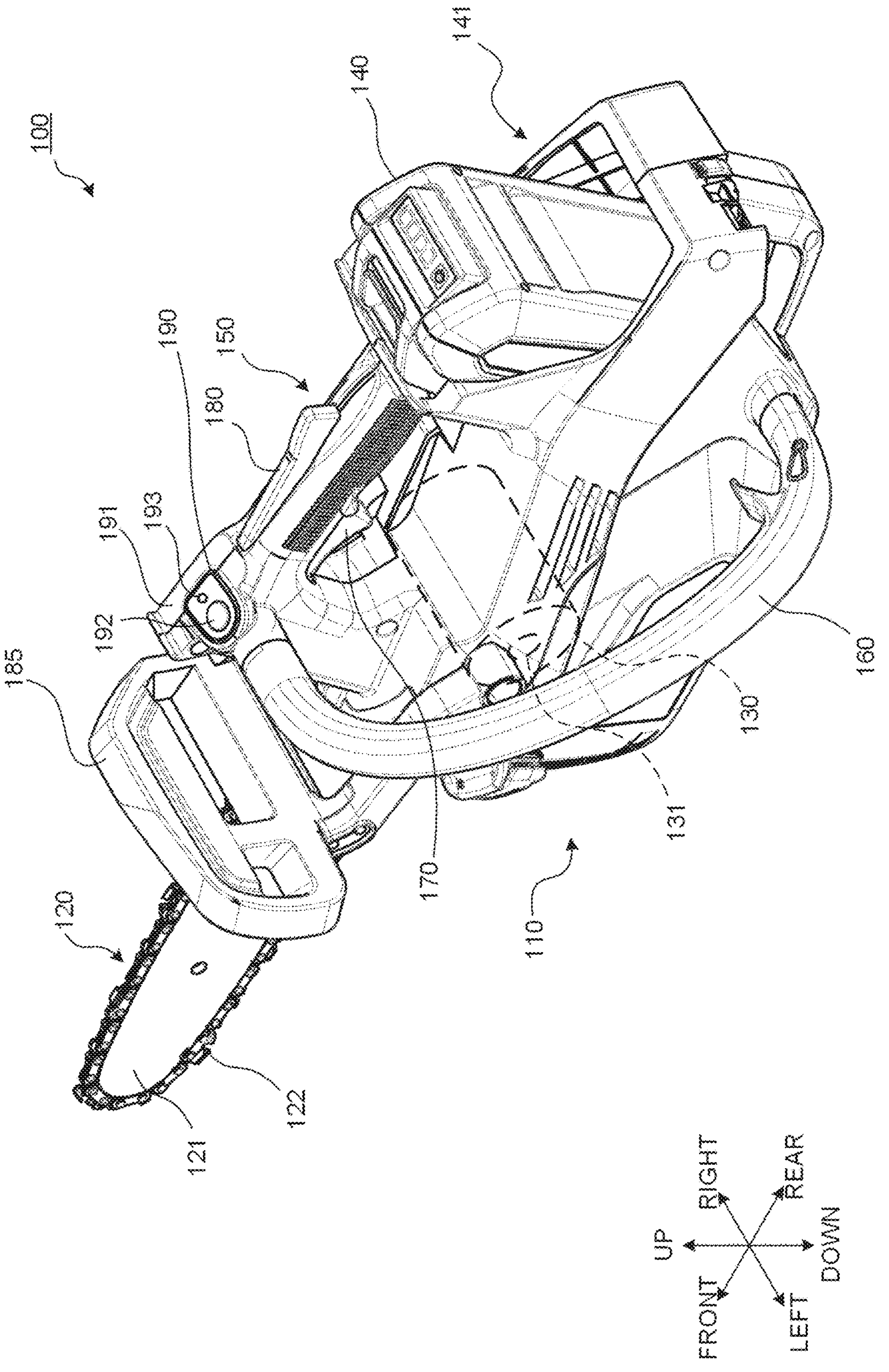
FIG. 2 is a perspective view of the chainsaw.

FIGS. 1 and 2 are perspective views of the chainsaw 100. The chainsaw 100 (electric work equipment) includes a body case 110, a cutting unit 120 (work tool), a motor 130, a battery 140, a top handle (handle) 150, a side handle 160, a trigger lever 170, a lockout lever 180, a brake lever 185, a switch panel 190, and a thumb rest 191. The chainsaw 100 is configured such that the cutting unit 120 is driven when power is supplied from the battery 140 mounted on the body case 110 to the motor 130.

The body case 110 is formed as a resin-made box.

The cutting unit 120 is formed to protrude forward from a front portion of the body case 110. The cutting unit 120 is a work tool for cutting work and includes a guide bar 121 and a saw chain 122. The guide bar 121 is a plate member extending in the front-rear direction, and the rear end of the guide bar 121 is mounted on a right side portion of the body case 110. The annular saw chain 122 is wound around the perimeter of the guide bar 121. The rear end of the saw chain 122 is engaged with a drive gear (not shown) connected to the output shaft 131 (to be discussed later) of the motor 130. The saw chain 122 is configured to rotate along the perimeter of the guide bar 121 when the motor 130 drives the drive gear.

The motor 130 is housed in a front portion of the body case 110. The motor 130 is configured to drive the cutting unit 120. The motor 130 is a known electric motor. The motor 130 includes the output shaft 131. The output shaft 131 extends in the left-right direction. In addition to the motor 130, a control board (not shown) for controlling the operation of the motor 130 and a drive mechanism such as the drive gear connected to the output shaft 131 of the motor 130 are housed in the front portion of the body case 110.

The battery 140 is removably disposed in a rear portion of the body case 110. A battery installation/removal portion 141, which the battery 140 can be installed and removed, is formed on the rear portion of the body case 110. When installing the battery 140 in the body case 110, it can be installed into the battery installation/removal portion 141 by sliding it downward with respect to the battery installation/removal portion 141. The battery installation/removal portion 141 is provided with an ejection mechanism (not shown) for removing the battery 140 from the battery installation/removal portion 141. The battery 140 installed in the battery installation/removal portion 141 can be pushed up by operating a lever provided on an upper portion of the battery 140 to activate the ejection mechanism.

The battery 140 is a known battery where a rechargeable battery such as a lithium-ion storage battery is housed in a rectangular parallelepiped case extending in the up-down direction. The battery 140 is formed such that the height thereof is greater than that of the rear portion of the body case 110. The battery 140 according to the present embodiment is formed to be larger than a battery of a type that is housed in the body case 110. The battery 140 has a sufficiently high output and charge capacity for work.

The battery 140 is configured to supply power to the motor 130. A metal connection terminal (not shown) is disposed on the rear surface of the battery installation/removal portion 141. The connection terminal is electrically connected to the control board and the motor 130. By connecting the connection terminal of the battery 140 to the connection terminal of the battery installation/removal portion 141, power is supplied from battery 140 to the control board and the motor 130.

The top handle 150 protrudes from the body case 110 and is configured to be gripped by the operator. More specifically, the top handle 150 is formed to extend in the front-rear direction over an upper portion of the body case 110. The front end of the top handle 150 protrudes upward from the front end of the upper surface of the body case 110. The rear end of the top handle 150 is connected to the upper end of the battery installation/removal portion 141. With the battery 140 installed in the battery installation/removal portion 141, the upper end of the battery 140 protrudes above the rear end of the top handle 150. The top handle 150 is inclined slightly downward from the front end to the rear end. The top handle 150 is a portion that the operator grips when holding the chainsaw 100. The operator's hand is inserted into the space between the top handle 150 and the upper surface of the body case 110.

The side handle 160 is mounted on the left side surface of the body case 110 and is formed to extend in the front-rear direction around the perimeter of the body case 110. The side handle 160 extends in the front-rear direction from a front portion to a rear portion of the left side surface of the body case 110. The side handle 160 is a product formed by bending a cylindrical member or a molded product. The front end of the side handle 160 is mounted on the left side surface of the front end of the top handle 150. The rear end of the side handle 160 is located behind and below the output shaft 131 of the motor 130 and is mounted on the left side wall of the battery installation/removal portion 141. Thus, when working while tilting the chainsaw 100, the operator can grip the side handle 160 near the operator's body and thus work stably. The portion between the front and rear ends of the side handle 160 is curved to bulge outward from the left side surface of the body case 110.

The trigger lever 170 is disposed on the lower surface of the top handle 150. When the operator pulls the trigger lever 170 while gripping the top handle 150, power is supplied from the battery 140 to the motor 130.

The lockout lever 180 is disposed on the upper surface of the top handle 150. When the operator pushes in the lockout lever 180 with their palm while gripping the top handle 150, the trigger lever 170 is unlocked.

The brake lever 185 is supported on both side surfaces of the body case 110 so that it can swing in the front-rear direction. The brake lever 185 is formed to extend in an upward-forward direction of the body case 110 from support positions on both side surfaces of the body case 110. The brake lever 185 allows the saw chain 122 to rotate when pulled toward the operator and activates a chain brake (not shown) to stop the rotation of the saw chain 122 when pushed forward.

The switch panel 190 is disposed on the upper surface of a front portion of the top handle 150. The switch panel 190 includes a power switch 192 and an LED light 193 (indicator light). The thumb rest 191 is disposed near the switch panel 190.

The thumb rest 191 is an area on which the ventral surface of the right thumb is placed when the operator grips the top handle 150 with their right hand. The thumb rest 191 is disposed on an axis 151 extending in the front-rear direction and passing through the center in the left-right direction of the top handle 150.

The power switch 192 is formed as a push button switch that makes the motor 130 operable when turned on and stops the operation of the motor 130 when turned off. The power switch 192 is formed to be circular in plan view. The power switch 192 is toggled on and off each time it is pushed.

When the power switch 192 is pushed to turn it on with the operation of the motor 130 stopped, power is supplied from the battery 140 to the control board (not shown) to put the motor 130 on standby. Then, when the trigger lever 170 is pulled with the lockout lever 180 pushed in, power is supplied from the battery 140 to the motor 130 through the control board to drive the motor 130. When the finger is released from the trigger lever 170 and the power switch 192 is pushed to turned it off without pushing the lockout lever 180, the power supply to the motor 130 is cut off to stop the operation of the motor 130.

The LED light 193 is disposed on the right side of the power switch 192. The LED light 193 indicates the on/off status of the power switch. The LED light 193 turns on when the power switch 192 is turned on and turns off when it is turned off.

2. Configuration of Switch Panel 190

The configuration of the switch panel 190 will be described in Section 2.

Figure 3:
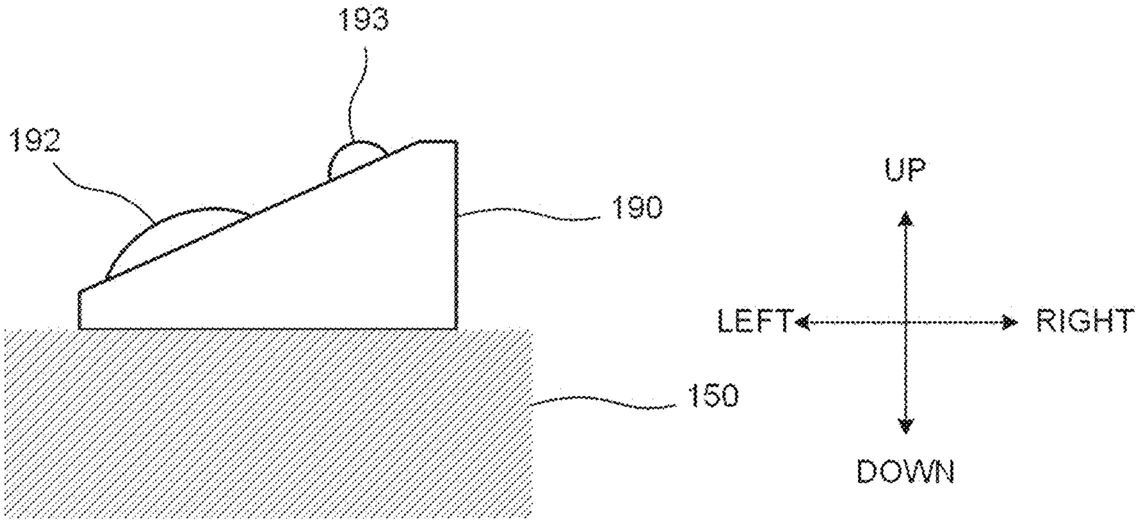
FIG. 3 is a view of a switch panel from the back of the chainsaw.
Figure 4:
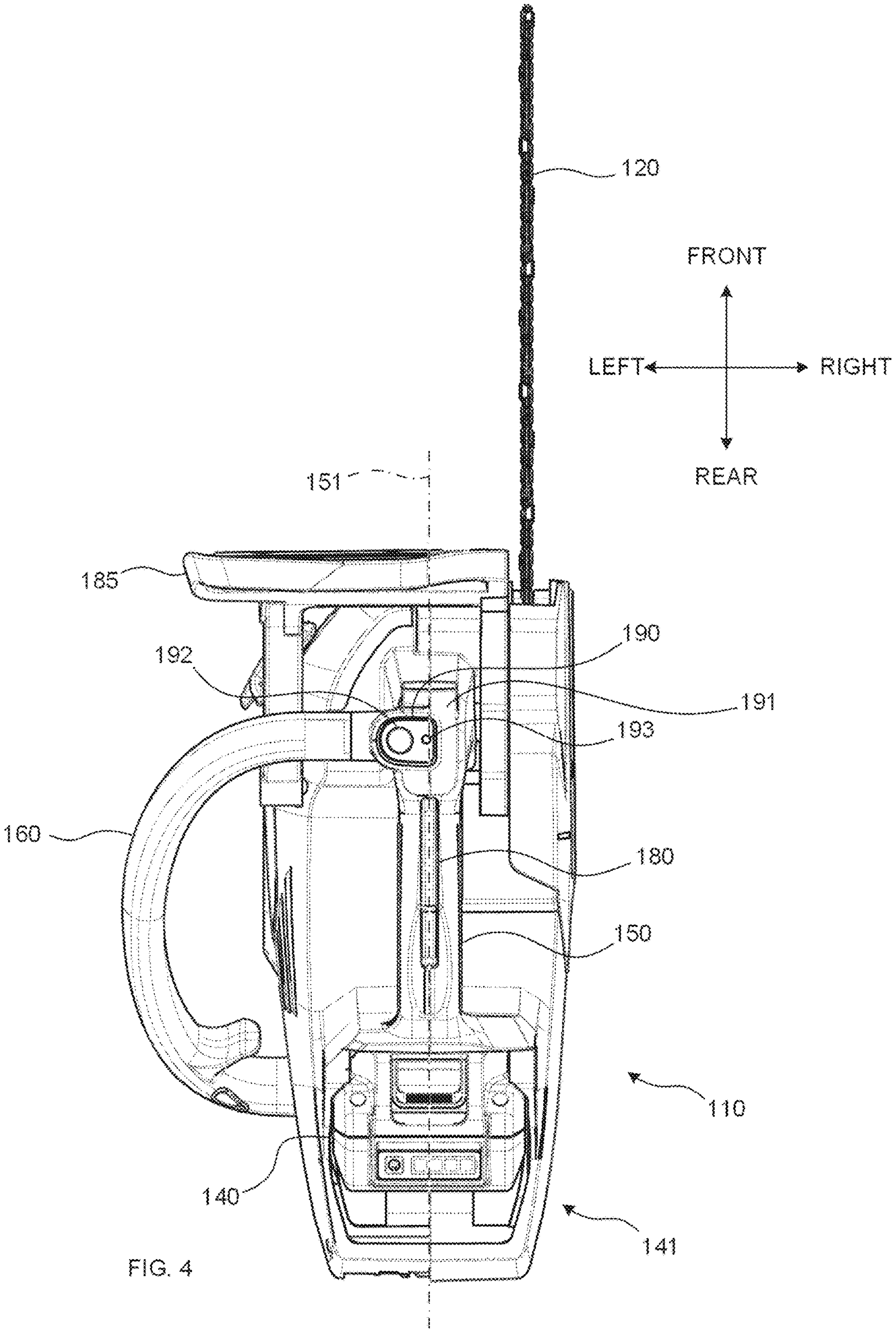
FIG. 4 is a plan view showing the positional relationship between the components of the switch panel and an axis.

FIG. 3 is a view of the switch panel 190 from the back of the chainsaw 100. FIG. 4 is a plan view showing the positional relationship between the components of the switch panel 190 and the axis 151.

The switch panel 190 is formed to be inclined downward from the right side (the side on which the side handle 160 is not mounted) to the left side (the side on which the side handle 160 is mounted). In the case where the inclination angle of the switch panel 190 is 0 degrees when the cutting unit 120 of the chainsaw 100 is vertical (as in FIG. 4) and the height of the portions (except for the convex portions where the power switch 192 and the LED light 193 are disposed) from the right to left end of the switch panel 190 is the same, the inclination angle is 1 to 89 degrees, preferably 15 to 75 degrees, more preferably 30 to 60 degrees. Specifically, for example, the inclination angle is 1, 3, 5, 7, 9, 11, 13, 15, 17, 19, 21, 23, 25, 27, 29, 31, 33, 35, 37, 39, 41, 43, 45, 47, 49, 51, 53, 55, 57, 59, 61, 63, 65, 67, 69, 71, 73, 75, 77, 79, 81, 83, 85, 87, or 89 degrees and may be in the range between any two of the values illustrated above.

In this way, the switch panel 190 is formed to be inclined. Thus, when the operator works while gripping the side handle 160 and tilting the chainsaw 100, the upper surface of the switch panel 190 is oriented toward the operator. Thus, when working while tilting the chainsaw 100, the operator can easily grasp the position of the power switch 192 and thus easily operate the power switch 192 compared with when the switch panel is not inclined. The operator also can easily grasp whether the LED light 193 is on or off.

The LED light 193 is disposed on the right side of the power switch 192 (the side on which the side handle is not mounted). According to such a configuration, when the operator works while gripping the side handle 160 and tilting the chainsaw 100, the LED light 193 is located in a farther position from the side handle 160 than the power switch 192. Specifically, when the cutting unit 120 is tilted horizontally, the LED light 193 is located in a position that is more visible for the operator than the power switch 192. Thus, when working while gripping the side handle 160 and tilting the chainsaw 100, the operator can easily grasp the on/off status.

The power switch 192 is disposed on the left side of the axis 151 extending in the front-rear direction and passing through the center in the left-right direction of the top handle 150 (the side on which the side handle is mounted). In the case where the operator grips the top handle 150 with, for example, the right hand, it is easier to move the right thumb leftward than rightward. For this reason, the above configuration allows the operator to easily operate the power switch 192 with the thumb of the hand gripping the top handle 150 (in this embodiment, the right hand).

The power switch 192 is disposed in a position that does not overlap the position of the trigger lever 170 in plan view. When pulling the trigger lever 170 with the index finger, the operator tends to apply a force to the thumb at the same time. At this time, if the thumb is positioned where it overlaps with the trigger lever 170 in plan view, the operator may erroneously operate the power switch 192 with the thumb. The configuration according to the present embodiment allows the operator to pull the trigger lever 170 with the index finger while placing the ventral surface of the thumb on the thumb rest 191 on the axis 151, thus preventing erroneous operation of the power switch 192 with the thumb.

3. Method for Operating Chainsaw 100

A method for operating the chainsaw 100 will be described in Section 3.

When cutting objects to be cut, such as trees or boards, using the chainsaw 100, the operator holds the chainsaw 100 by gripping the top handle 150 with the right hand and the side handle 160 with the left hand.

When the operator turns on the power switch 192 of the chainsaw 100, pulls the brake lever 185 toward them to release it, grips the top handle 150 with the right hand, and pushes in the lockout lever 180 with the palm, the trigger lever 170 is unlocked. At this time, the operator can hold the top handle 150 stably by placing the ventral surface of the thumb of the right hand gripping the top handle 150 on the thumb rest 191.

Then, the operator shifts the right thumb leftward and pushes the power switch 192 to turn it on. Thus, the LED light 193 turns on and the motor is put on standby. Then, after the operator returns the ventral surface of the right thumb to the thumb rest 191, they pull the trigger lever 170 with the index finger of the right hand. This drives the motor 130, causing the saw chain 122 to rotate. This allows the operator to cut the objects to be cut using the saw chain 122.

During the work, the operator can cut the objects to be cut while placing the thumb on the thumb rest 191. Depending on the work situation, the operator grips the top handle 150 while placing the thumb on the thumb rest 191 lightly or pushes the objects to be cut by pressing the thumb rest 191 with the thumb. In either case, the operator can perform the cutting work stably.

For example, when cutting a tree, the operator needs to work while tilting the chainsaw 100 so that the cutting unit 120 becomes horizontal. In this case, the operator performs the cutting work while tilting the chainsaw 100 by orienting the side handle 160 gripped by the left hand upward and orienting the top handle 150 gripped by the right hand rightward. During this cutting work, the operator grasps the position of the power switch 192 while checking the lighting status of the LED light 193 and turns on and off the power switch 192 with the right thumb.

To stop the work, the operator returns the trigger lever 170 to stop the operation of the motor 130, then shifts the right thumb leftward, and presses the power switch 192 to turn it off. To stop the work urgently, the operator may stop the operation of the motor 130 by pushing the power switch 192 with the right thumb to turn it off without returning the trigger lever 170.

As described above, the switch panel of the chainsaw 100 according to the present embodiment provides improved operability and visibility to the operator when they are working while tilting the chainsaw 100.

While the embodiment according to the present invention has been described above, the embodiment is only illustrative and is not intended to limit the scope of the invention. The above novel embodiment can be carried out in other various forms, and various omissions, replacements, or changes can be made thereto without departing from the gist of the invention. The embodiment and modifications thereof are included in the scope and gist of the present invention, as well as included in the scope of the invention set forth in the claims and equivalents thereof.

4. Modifications

Modifications of the above embodiment will be described in Section 4. The following modifications can be combined as appropriate.

Figure 5:
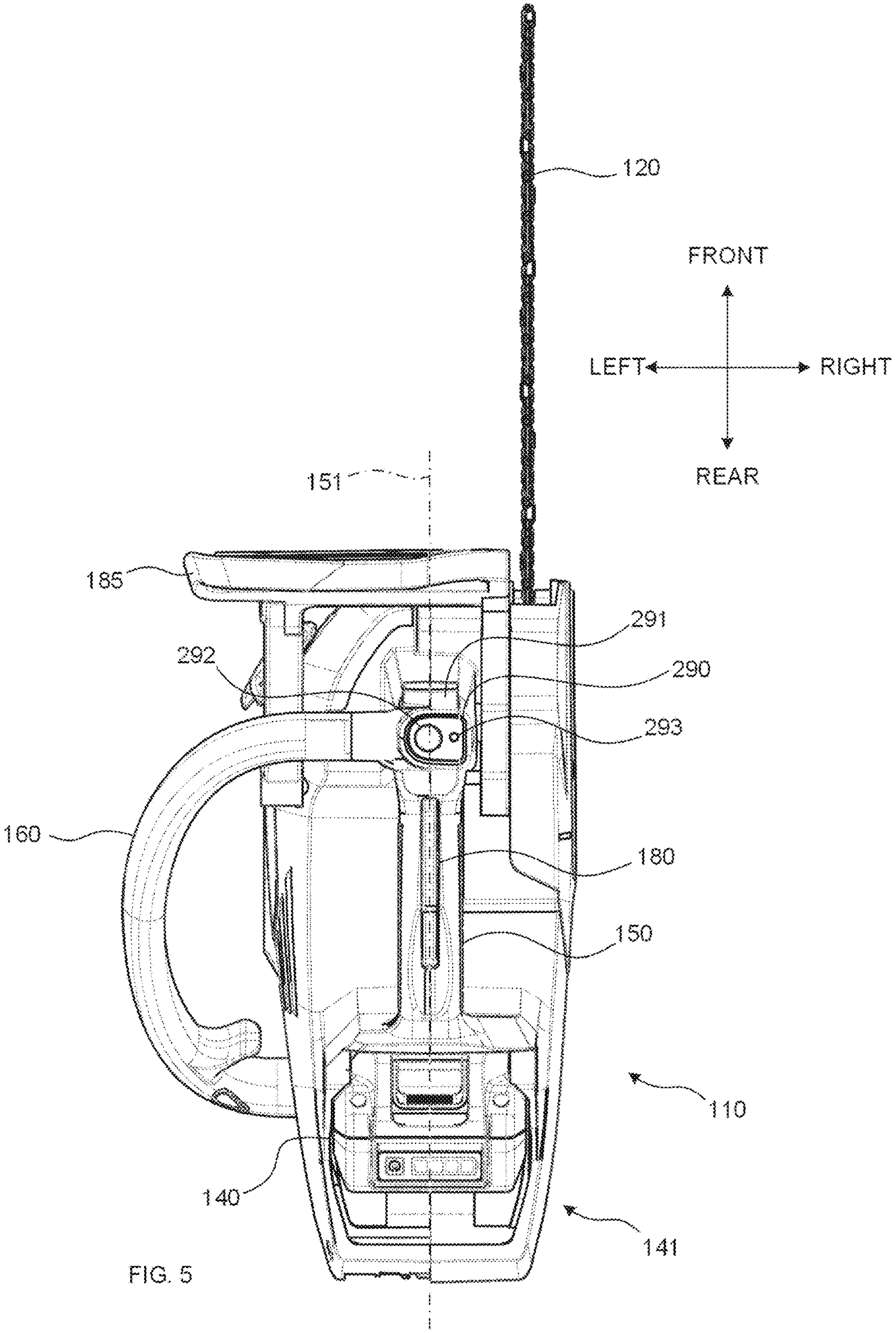
FIG. 5 is a plan view showing the positional relationship between the components of a switch panel and an axis.

FIG. 5 is a plan view showing the positional relationship between the components of a switch panel 290 and an axis 151. The switch panel 290 includes a power switch 292 and an LED light 293. Here, the thumb rest 291 is disposed as an area of the front end of a top handle 150 that is an area adjacent to the switch panel 290. The thumb rest 291, power switch 292, and LED light 293 have configurations similar to those of the thumb rest 191, power switch 192, and LED light 193 of the switch panel 190.

The power switch 292 may be disposed on the axis 151 extending in the front-rear direction and passing through the center in the left-right direction of the top handle 150. When the operator grips the top handle 150 with the right hand, the position where the right thumb applies the maximum force is along the axis 151. For this reason, the above configuration allows the operator to push the power switch 292 more reliably using the thumb of the hand gripping the top handle 150.

Figure 6:
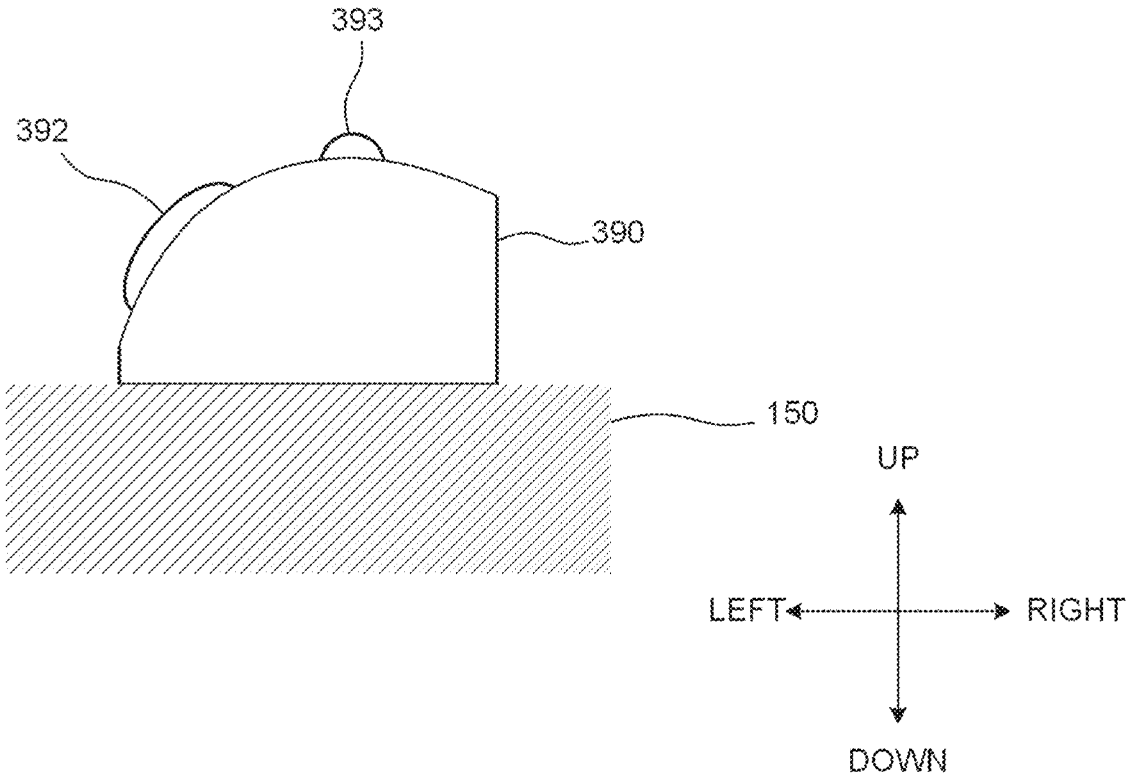
FIG. 6 is a view of a switch panel from the back of the chainsaw.

FIG. 6 is a view of a switch panel 390 from the back of a chainsaw 100. The switch panel 390 includes a thumb rest 391, a power switch 392, and an LED light 393. The thumb rest 391, power switch 392, and LED light 393 have configurations similar to those of the thumb rest 191, power switch 192, and LED light 193 of the switch panel 190.

The switch panel 390 may be formed to have a curved surface. In an example in FIG. 6, the switch panel 390 is inclined downward from the right side to the left side, and the inclined surface (the upper surface of the switch panel 390) is formed as a curved surface. When the operator moves the thumb laterally while gripping the top handle 150, the thumb tends to draw a curved trajectory. For this reason, the above configuration allows the operator to operate the power switch 392 with improved operability.

While, in the above embodiment, the switch panel 190 is described as being inclined downward from the right side to the left side, this is not limiting. The switch panel 190 may be formed to be inclined downward from the left side to the right side.

While, in the above embodiment, the side handle 160 is described as being mounted on the left side surface of the body case 110, this is not limiting. The side handle 160 may be mounted to extend from the right side surface to the left side surface of the body case 110.

While, in the above embodiment, the chainsaw 100 is a top-handle chainsaw and therefore the top handle 150 has been described as an example of the claimed handle, this is not limiting. For example, if the chainsaw 100 is a rear-handle chainsaw, a rear handle corresponds to the claimed handle.

If the chainsaw 100 is a rear-handle chainsaw, the side handle is mounted to extend from the right side surface to the left side surface of the body case 110. In the case where the side handle is gripped by, for example, the left hand, a portion of the side handle above the body case 110 and a portion of the side handle on the left side of the body case 110 can be gripped, while a portion of the side handle on the right side of the body case 110 cannot be gripped. For this reason, the switch panel 190 may be formed to be inclined downward from the side on which the side handle cannot be gripped (the right side of the body case 110) to the side on which the side handle can be gripped (the left side of the body case 110).

Similarly, when the chainsaw 100 is a rear-handle chainsaw, the LED light 193 may be disposed to be closer to the side on which the side handle cannot be gripped (the right side of the body case 110) than the power switch 192.

Similarly, when the chainsaw 100 is a rear-handle chainsaw, the power switch 192 may be disposed to be closer to the side on which the side handle can be gripped (the left side of the body case 110) than the axis 151.

The thumb rest 191 may be disposed in an area in which the LED light 193 is disposed on the switch panel 190.

While, in the above embodiment, the chainsaw 100 to which the present invention is applied has been described, electric work equipment to which the present invention can be applied is not limited to a particular type of electric work equipment. The present invention can be applied to various types of electric work equipment such as brush cutters, hedge trimmers, and blowers.

5. Others

The present invention may be provided in aspects described below.

(1) Electric work equipment, comprising: a body case; a work tool formed to protrude forward from a front portion of the body case; a motor housed in the body case and configured to drive the work tool; a battery removably disposed in the body case and configured to supply power to the motor; a handle protruding from the body case and configured to be gripped; a trigger lever disposed on a lower surface of the handle and configured such that power is supplied from the battery to the motor when pulled; and a switch panel disposed on an upper surface of the handle and comprising a power switch, the power switch being configured to make the motor operable when turned on and to stop operation of the motor when turned off, wherein the switch panel is formed to be inclined downward from a right to left side thereof or from the left to right side thereof.

According to this embodiment, the switch panel provides improved operability and visibility to the operator when they are working while tilting the electric work equipment.

(2) The electric work equipment according to (1), further comprising a side handle, wherein the side handle is mounted on a side surface of the body case and is formed to extend around a perimeter of the body case, and wherein the switch panel is formed to be inclined downward from a side on which the side handle is not mounted to a side on which the side handle is mounted or from a side on which the side handle cannot be gripped to a side on which the side handle can be gripped.

According to this embodiment, the switch panel provides improved operability and visibility to the operator when they are working while gripping the side handle and tilting the electric work equipment.

(3) The electric work equipment according to (2), wherein the switch panel further comprises an indicator light, wherein the indicator light indicates an on/off status of the power switch, and wherein the indicator light is disposed to be closer to a side on which the side handle is not mounted or a side on which the side handle cannot be gripped than the power switch.

According to this embodiment, the operator can easily grasp the on/off status of the power switch when they are working while gripping the side handle and tilting the electric work equipment.

(4) The electric work equipment according to (2) or (3), wherein the power switch is disposed to be closer to the side on which the side handle is mounted or the side on which the side handle can be gripped than an axis extending in a front-rear direction and passing through the center in a left-right direction of the handle.

According to this embodiment, the operator can easily operate the power switch using the thumb of the hand gripping the handle.

(5) The electric work equipment according to any one of (1) to (3), wherein the power switch is disposed on an axis extending in a front-rear direction and passing through the center in a left-right direction of the handle.

According to this embodiment, the operator can push the power switch more reliably using the thumb of the hand gripping the handle.

(6) The electric work equipment according to any one of (1) to (5), wherein the power switch is disposed in a position that does not overlap a position of the trigger lever in plan view.

According to this embodiment, the erroneous operation of the power switch can be prevented when pulling the trigger lever.

(7) The electric work equipment according to any one of (1) to (6), wherein the switch panel is formed to have a curved surface.

According to this embodiment, the operator can be prevented from catching their thumb on the switch panel when moving it laterally.

(8) The electric work equipment according to any one of (1) to (7), wherein the electric work equipment is a chainsaw.

Such an aspect is preferred when the electric work equipment is a chainsaw. Of course, the electric work equipment is not limited to a chainsaw.

What is claimed is:

1. Electric work equipment, comprising:

a body case having a first side and a second side opposite to each other in a plan view;

a work tool formed to protrude forward from a front portion of the body case;

a motor housed in the body case and configured to drive the work tool;

a battery removably disposed in the body case and configured to supply power to the motor;

a handle protruding from the body case and configured to be gripped;

a trigger lever disposed on a lower surface of the handle and configured such that the power is supplied from the battery to the motor when the trigger lever is operated;

a side handle mounted on a side surface located at only the second side of the body case, the side handle extending around a perimeter of the body case such that the side handle is not mounted on the side surface located at the first side of the body case; and a switch panel disposed on an upper surface of the handle, the switch paned including a power switch and an indicator light, the power switch being configured to make the motor operable when the power switch is an ON state and to stop operation of the motor when the power switch is an OFF state, the indicator light indicating the ON and OFF states of the power switch, wherein a top surface of the switch panel is inclined downward from the first side of the body case to the second side of the body case, and the power switch is located closer to the second side of the body case than the indicator light.

2. The electric work equipment according to claim 1, wherein the power switch is disposed to be closer to the second side of the body case than an axis extending in a front-rear direction and passing through the center in a left-right direction of the handle.

3. The electric work equipment according to claim 1, wherein the power switch is disposed on an axis extending in a front-rear direction and passing through the center in a left-right direction of the handle.

4. The electric work equipment according to claim 1, wherein the power switch is disposed in a position that does not overlap a position of the trigger lever in the plan view.

5. The electric work equipment according to claim 1, wherein the top surface of the switch panel is a curved surface.

6. The electric work equipment according to claim 1, wherein the electric work equipment is a chainsaw.

* * * * *